(12) United States Patent
St. Clair et al.

(10) Patent No.: US 6,737,485 B1
(45) Date of Patent: May 18, 2004

(54) TITANIUM CHELATE DISPERSIONS

(75) Inventors: Jerry Dale St. Clair, Wallingford, PA (US); Thomas W. DelPesco, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/420,149

(22) Filed: Apr. 22, 2003

(51) Int. Cl.[7] .................................................. C08F 4/42
(52) U.S. Cl. ..................... 526/142; 526/219.5; 526/316
(58) Field of Search .............................. 526/219.5, 316, 526/142; 524/413

(56) References Cited

U.S. PATENT DOCUMENTS

| | | | |
|---|---|---|---|
| 3,694,475 A | * 9/1972 | Brook et al. | 260/429.5 |
| 4,313,851 A | 2/1982 | Barfurth et al. | |
| 4,470,915 A | 9/1984 | Conway | |
| 4,609,746 A | 9/1986 | Barfurth et al. | |
| 4,749,040 A | * 6/1988 | Hodge | 166/308 |
| 4,861,500 A | 8/1989 | Hodge | |

FOREIGN PATENT DOCUMENTS

| | | | |
|---|---|---|---|
| JP | 48-34132 A | | 5/1973 |
| JP | 48-34132 | * | 5/1973 |
| JP | 11-293171 A | | 10/1999 |
| JP | 11-293171 | * | 6/2000 |
| JP | 2000-259509 A | | 6/2000 |

* cited by examiner

*Primary Examiner*—Ling-Siu Choi

(57) ABSTRACT

A composition and a process for producing the composition are disclosed. The composition comprises a titanium chelate polymer and a stabilizer. The process can comprise (1) contacting a tetraalkyl titanate with a chelating agent to produce a product mixture comprising a titanium chelate and an alcohol; (2) contacting the product mixture with water under a condition effective to produce a dispersion of a titanium chelate polymer; (3) optionally reducing the alcohol content of the dispersion; and (4) contacting the dispersion with a stabilizing amount of a stabilizer to produce a stable dispersion of titanium chelate polymer.

20 Claims, No Drawings

TITANIUM CHELATE DISPERSIONS

FIELD OF THE INVENTION

This invention relates to a composition and a process therefor, in which the composition comprises a stable aqueous polymeric dispersion of titanium chelates.

BACKGROUND OF THE INVENTION

The polymers of chelated titanium orthoesters with water have a number of industrial uses. They are valuable in a variety of applications such as in pigments, catalysts, and surface modifiers. As used herein, the term "polymer" refers to both lower molecular weight oligomers and higher molecular weight polymers.

The polymers made by reacting titanium chelates with water are typically solid materials, which makes them difficult to prepare and use without specialized solids processing equipment. For many applications, a ready-made aqueous dispersion of such polymers would be preferable and easier to manufacture and handle, but generally the solid polymers quickly settle out of the water. This results in multiple layers and settled solids, which can be very difficult to resuspend and distribute uniformly throughout the water. A uniform distribution is necessary for uniform feeding to a continuous or multi-batch, process.

A number of patents such as, for example, JP 53036449, JP 530364450, JP 1999293171, JP 48034132, U.S. Pat. Nos. 3,694,475, 4,313,851, 4,609,746, 5,423,380, 5,478,802, 4,861,500, 4,749,040, and 4,470,915 disclose titanium chelate polymers and/or dispersions thereof. However, none discloses how to stabilize such a suspension in water, especially alcohol-free.

There is, therefore, a need for a more stable and/or easily redispersable aqueous dispersion of a titanium chelate polymer composition and a process therefor.

SUMMARY OF THE INVENTION

A composition comprises a titanium chelate polymer and a stabilizer in which the polymer comprises repeat units derived from a titanium chelate.

A process comprises (1) contacting a tetraalkyl titanate with a chelating agent to produce a product mixture comprising a titanium chelate and an alcohol; (2) contacting the product mixture with water under a condition effective to produce a dispersion of a titanium chelate polymer; (3) optionally reducing the alcohol content in the dispersion of titanium chelate polymer; and (4) contacting the dispersion with a stabilizing amount of a stabilizer to produce a stable dispersion of titanium chelate polymer.

DETAILED DESCRIPTION OF THE INVENTION

The term "stable dispersion" refers to a dispersion or suspension that remains substantially soluble or dispersible or suspended, or does not form a hardened or cemented settled solid layer, in a liquid, preferably aqueous, and more preferably water at about 25° C. for at least 1 day, preferably at least 3 days, and more preferably at least 5 days. The term further refers to a dispersion or suspension comprising suspended or dispersed solids that, upon settlement, are easily re-dispersed or resuspended. The dispersion preferably contains about 1 to about 75%, about 5 to about 75%, more preferably 10 to 50% by weight of the polymer. These dispersions preferably do hot settle readily and are easily redispersed. The number of repeat units can be from 2 to about 2000.

The polymer in the stable dispersion comprises one or more titanium chelate polymers. The term "titanium chelate polymer" refers to a polymer comprising repeat units derived from a titanium chelate having the formula of $TiX_m(OR)_n$, where X is a radical derived from a chelating agent, m represents an average of the integral numbers which individually range from 0 and to 2 but at least one m that cannot be 0, and n represents an average of the integral numbers which range from 2 to 4; and R is independently H, or an alkyl or aryl group which may be further substituted. One skilled in the art recognizes that this polymer generally comprises one or more repeat units selected from the formula selected from the group consisting of $TiX_2O$, $TiX_2(OR)O$, $TiX(O)_2$, $TiX(OR)O$, $TiX(OR)_2O$, $Ti(O)_2$, $Ti(OR)(O)_2$, and $Ti(OR)_2(O)_2$. The polymer may also contain unpolymerized monomers or intermediates such as, for example, $Ti(X)_2(OR)_2$, $TiX(OR)_3$, $Ti(OR)_4$, and units arising from other reactive species present during the polymerization.

A preferred chelating agent is an organic 1,3-dicarbonyl compound such as a diketone, a diester, a ketoester, and combinations of two or more thereof. A radical derived from any 1,3-diketone can be used. The preferred diketones include, but are not limited to, 2,4-pentanedione, 1,4-hexanedione, 1,3-pentanedione, 2,4-hexanedione, dipivaloyl methane, or combinations of two or more thereof.

Also, a radical derived from any 1,3-diester can be used. The preferred diesters include, but are not limited to, dimethyl malonate, diethyl malonate, or combinations thereof.

Similarly, a radical derived from any 1,3-ketoester can be used. The preferred ketoester include, but are not limited to, methyl acetoacetate, ethyl acetoacetate, isopropyl acetoacetate, butyl acetoacetate, and combinations of two or more thereof.

The most preferred chelating agent is 2,4-pentanedione, ethyl acetoacetate, or combinations thereof. Especially preferred are those in which X is an acetylacetonato group and m averages about 2.

Examples of titanium chelate polymers include, but are not limited to, oxybis(2,4-pentanedionato)titanium homopolymer, oxybis(2,4-hexanedionato)titanium polymer, oxybis(2,2,6,6-tetramethyl-3,5-heptanedionato)titanium homopolymer, oxybis(diethylmalonato)titanium homopolymer, oxybis(ethyl 3-oxobutanoato-O1',O3) titanium homopolymer, and combinations of two or more thereof.

Any compounds that, when combined with a titanium chelate polymer disclosed above, produce a stable dispersion of a titanium chelate polymer can be a stabilizer. Examples of stabilizers include hydroxy carboxylic acids, alkoxylated (for example, ethoxylated) quaternary ammonium salts, aminocarboxylic acid, alkanolamines, inorganic phosphate salts, or combinations of two or more thereof. Examples of hydroxy carboxylic acids include citric acid, lactic acid, glycolic acid, tartaric acid, malic acid, or combinations of two or more thereof. Examples of suitable alkoxylated quaternary ammonium salts include E-sperse 100®, available from Ethox Chemicals Co. (Greenville, S.C., USA). Examples of alkanolamines include ethanolamine, diethanolamine, triethanolamine, or combinations of two or more thereof. Examples of aminocarboxylic acid include tetrahydroxyisopropylethylenediamine, glycine, bis-hydroxyethyl glycine, hydroxyethyl glycine, or combinations of two or more thereof. Examples of inorganic phosphorus-containing salts include tetrapotassium pyrophosphate, potassium tripolyphosphate, sodium tripolyphosphate, potassium tetra phosphate, sodium pentapolyphosphate, sodium hexapolyphosphate, potassium pyrophosphate, potassium pyrophosphite, sodium pyrophosphate, sodium pyrophosphate decahydrate, sodium pyrophosphite, ethyl phosphonate, propyl phosphonate, hydroxymethyl phosphonate, di(polyoxyethylene) hydroxymethyl phosphonate, methylphosphonoacetate, ethyl methylphosphonoacetate, methyl ethylphosphonoacetate, ethyl ethylphosphonoacetate, propyl dimethylphosphonoacetate, methyl diethylphosphonoacetate, triethyl phosphonoacetate, or combinations of two or more thereof. Other stabilizers may also be used, as readily determined by, for example, simply mixing them with a titanium chelate polymer composition slurry. The preferred stabilizers are hydroxy carboxylic acids. The most preferred stabilizer is citric acid.

The above dispersions may optionally contain other components such as nonionic, cationic, or anionic surfactants, in the range of from about 0.001 to about 50 percent by weight of the dispersion.

A stabilizing amount of the stabilizer can be present in a composition. The term "stabilizing amount" means an amount that can produce a stable dispersion disclosed above and can range from about 0.001% to about 20%, preferably about 0.01% to about 10%, more preferably 0.01% to 5%, and most preferably 0.05% to 2%, by weight relative to the weight of aqueous dispersion.

The titanium chelate polymer may readily be produced by any means known to one skilled in the art. For example, the polymer is produced by reacting water with a titanium chelate having the general formula $TiX_m(OR)_n$, wherein R, X, m and n are the same as those disclosed above. Examples of suitable titanium chelates include dibutoxybis(2,4-pentanedionato)titanium, dipropoxybis(2,4-pentanedionato) titanium, diisopropoxybis(2,4-pentanedionato)titanium, diethoxybis(2,4-pentanedionato)titanium, dibutoxybis(ethyl 3-oxobutanoato-O1',O3)titanium, dipropoxybis(ethyl 3-oxobutanoato-O1',O3)titanium, diisopropoxybis(ethyl 3-oxobutanoato-O1',O3)titanium, diethoxybis(ethyl 3-oxobutanoato-O1',O3)titanium, dibutoxybis(2,2,6,6-tetramethyl-3,5-heptanedionato)titanium, dipropoxybis(2,2, 6,6-tetramethyl-3,5-heptanedionato)titanium, diisopropoxybis(2,2,6,6-tetramethyl-3,5-heptanedionato) titanium, diethoxybis(2,2,6,6-tetramethyl-3,5-heptanedionato)titanium, and combinations of two or more thereof. Especially preferred are those in which X is an acetylacetonato group and m averages about 2. These compounds are readily available in an alcohol solution. For example, Tyzor® AA, a propanol solution of titanium acetylacetonate, is available from E. I. du Pont de Nemours and Company, Wilmington, Del.

A titanium chelate polymer can be produced by a process comprising (1) contacting a tetraalkyl titanate with a chelating agent to produce a product mixture comprising a titanium chelate and an alcohol; (2) contacting the product mixture with water under a condition effective to produce a dispersion or slurry of a titanium chelate polymer; (3) optionally reducing the alcohol content in the dispersion: and (4) contacting the dispersion with a stabilizing amount of a stabilizer to produce a stable dispersion of titanium chelate polymer.

The tetraalkyl titanate, which can also be referred to by one skilled in the art as titanium tetraalkoxide, can have the formula of $Ti(OR)_4$ where each R is individually a hydrocarbyl radical, as disclosed above, and can contain from 1 to about 10, preferably 1 to about 8, and most preferably 2 to 5 carbon atoms per radical and each R can be the same or different. Suitable tetraalkyl titanates include, but are not limited to, tetraethyl titanate, tetrapropyl titanate, tetraisopropyl titanate, tetrabutyl titanate, tetraisobutyl titanate, tetra-tert-butyl titanate, tetrahexyl titanate, and combinations of two or more thereof. The preferred tetraalkyl titanate is tetraethyl titanate, tetraisopropyl titanate, tetrabutyl titanate, or combinations thereof.

The chelating agent is the same as that disclosed above. The product mixture comprises a titanium chelate and an alcohol. The alcohol produced is derived from the tetraalkyl titanate and therefore has the same carbon number as the titanate. For example, if tetraethyl titanate is employed, the alcohol is ethanol and if tetraisopropyl titanate is used, it is isopropanol. Alcohol in the product mixture can be reduced to less than 10%, preferably less than 5%, and most preferably less than 1% by weight.

The molar ratio of tetraalkyl titanate to the chelating agent can be any ratio so long as the ratio can produce a composition having the characteristics disclosed in the first embodiment of the invention. Generally, the ratio is the one that produces mixed chelates having the numbers of m disclosed above, preferably m is about 2.

The molar ratio of water to the tetraalkyl titanate can be any ratio so long as the ratio can produce a dispersion or slurry of a titanium chelate polymer. Generally, the ratio in the final slurry or dispersion can be in the range of from about 1:1 to about 500:1, preferably about 10:1 to about 250:1, and most preferably about 20:1 to about 100:1. Preferably, the water is at least n/2 equivalents in which n is the same as disclosed above.

The process can be carried out under any suitable condition effective to produce the dispersion or slurry. A suitable condition for producing a titanium chelate from a tetraalkyl titanate and for producing a dispersion or slurry can include a temperature below about 80° C., preferably below about 70° C., and most preferably below about 65° C. under any pressure that can accommodate the temperature, preferably atmospheric pressure, for a period in the range of from about 0.1 to about 100, preferably about 0.5 to about 50, more preferably about 0.5 to about 30, and most preferably about 0.5 to about 20 minutes.

Preferably contacting of the product mixture and water is carried out using a high shear mixer to disperse the titanium chelate into small particles prior to polymerization. This serves to reduce and narrow the particle size distribution of solid polymer particles in the slurry or dispersion, probably through initial formation of smaller solid particles, and possibly through the breaking up of agglomerated solid polymer particles in the slurry. This step improves the stability of the resulting dispersions.

Also preferably, the slurry is stripped of alcohol solvent and liberated alcohol. Such stripping of the alcohol improves the stability of the resulting dispersions, and also reduces their flammability and emissions during handling. Preferably, the stripping is carried out at a temperature below the decomposition temperature of the resulting polymer. This may require the use of pressures below atmospheric pressure. If foaming occurs, it may be controlled by the addition of a defoaming agent at any time before or during the stripping operation. While any defoaming agent may then be used, we have found that satisfactory results can be obtained using a commercially available defoamer, Pluronic L-31, an oxirane-methyloxirane copolymer available from BASF Corporation (Ludwigshafen, Germany).

One or more stabilizers disclosed above can be used before or after the stripping.

For easy transportation, a titanium chelate polymer produced by the above-described process can be separated and recovered by any means known to one skilled in the art such as, for example, centrifugation, decantation, filtration, and other means. The titanium chelate polymer so produced can be ground to produce ground polymer. The ground polymers can then be mixed with water to produce a dispersion followed by contacting the dispersion with a stabilizer to produce a stable dispersion of titanium chelate polymer. The condition can be the same as that disclosed above.

EXAMPLES

Example 1

Preparation of 20% Oxybis(2,4-pentanedionato-O, O')titanium Homopolymer Slurry in Water Using High Shear Mixing To a 2 L beaker was charged 428 g of distilled water and 7.5 g of Pluronic L-31 (BASF, oxirane-methyloxirane copolymer). A Gifford-Wood model 76-1L mixer was immersed in the water and started. Into the suction of the mixer head was charged 185 g of a solution of 75% diisopropoxybis(2,4-pentanedionato) titanium in 2-propanol over 30 minutes. Agitation was continued for 15 minutes.

The milky yellow slurry was transferred to a vacuum distillation apparatus using 70 mL of distilled water to assist with the transfer. The vacuum distillation apparatus was equipped with a 1 liter round bottom pot, magnetic stirring, vacuum still head with water-cooled condenser, and 250 mL receiver. The 2-propanol and excess water were stripped from the reaction mass at 100 mm Hg until 250 mL of distillate were recovered. Recovery of the residual pot material yielded 388 g of product as a yellow slurry. The product was analyzed for titanium (as $TiO_2$), and was found to contain 7.24% TiO2 (corresponding to 23.8% titanium polymer solids).

Unless treated with a suitable dispersing agent (see Example 2), the slurry settled within hours and formed a solid layer which hardened over time to become increasingly difficult to resuspend.

Example 2

Dispersions of Oxybis(2,4-pentanedionato-O,O') titanium Homopolymer in Water

Samples of the slurry prepared as in Example 1 were weighed into small bottles. Varying amounts of different dispersing agents were added to each bottle, the bottle was capped, and the contents were well-shaken. The bottles were then allowed to sit undisturbed for 2–5 days, at which time the degree of settling was determined. This determination involved measuring the height of the upper liquid layer (if present) divided by the total sample height, and yielded a measure of the degree of settling on a numeric scale ranging from 0 (no settling) to about 0.55 (completely settled). In addition, the bottles were slowly rotated to determine whether a firm solids layer had formed at the bottom of the bottle.

The details of the test conditions and results for this study are summarized in the following table.

| Additive | Slurry Weight, g | Additive Weight, g | Settling Time, h | Extent of Settling | Comment[1] |
|---|---|---|---|---|---|
| lactic acid[2] | 15 | 0.04 | 96 | 0.53 | N |
| lactic acid[2] | 15 | 0.07 | 96 | 0.53 | N |
| lactic acid[2] | 15 | 0.20 | 120 | 0.14 | Y |
| glycolic acid | 15 | 0.03 | 96 | 0.53 | N |
| glycolic acid | 15 | 0.06 | 96 | 0.23 | Y |
| glycolic acid | 15 | 0.08 | 120 | 0.06 | Y |
| citric acid | 30 | 0.03 | 12 | 0.51 | N |
| citric acid | 30 | 0.06 | 72 | 0.14 | Y |
| citric acid | 30 | 0.11 | 72 | 0.06 | Y |
| citric acid | 30 | 0.18 | 72 | 0.03 | Y |
| citric acid | 30 | 0.24 | 72 | 0.00 | Y |
| CA-DEA[3] | 15 | 0.04 | 120 | 0.57 | N |
| CA-NaOH[4] | 15 | 0.03 | 120 | 0.56 | N |
| ethanolamine | 15 | 0.10 | 72 | 0.00 | Y |
| ethanolamine | 15 | 0.32 | 72 | 0.11 | Y |
| diethanolamine, 85% | 15 | 0.12 | 72 | 0.46 | M |
| diethanolamine, 85% | 15 | 0.35 | 72 | 0.54 | M |
| triethanolamine | 15 | 0.06 | 72 | 0.14 | Y |
| triethanolamine | 15 | 0.33 | 72 | 0.36 | Y |
| E-sperse-100[5] | 15 | 0.03 | 96 | 0.44 | N |
| E-sperse-100[5] | 15 | 0.07 | 96 | 0.00 | Y |
| E-sperse-100[5] | 15 | 0.14 | 120 | 0.00 | Y |
| TPP[6] | 30 | 0.02 | 72 | 0.08 | Y |
| TPP[6] | 30 | 0.07 | 72 | 0.54 | N |
| TPP[6] | 30 | 0.12 | 72 | 0.52 | Y |
| Dysperbyk-183[7] | 15 | 0.16 | 72 | 0.22 | N |
| Dysperbyk-192[7] | 15 | 0.47 | 72 | 0.68 | N |

[1]Y = stable dispersion, no apparent solids layer, easily redispersible; N = significant settling or solids layer, not easily redispersible
[2]DL-lactic acid, 85% solution in water
[3]citric acid with 0.201 g diethanolamine also added
[4]citric acid with 0.212 g of 50% aqueous sodium hydroxide also added
[5]proprietary ethoxylated quaternary surfactant, from Ethox Chemicals.
[6]Tetrapotassium pyrophosphate.
[7]a proprietary polymer of unknown composition, from BYK Chemie, Wesel, Germany.

What is claimed is:

1. A composition comprising a dispersion of titanium chelate polymer wherein said dispersion comprises said polymer and a stabilizer, said polymer comprises repeat units derived from a titanium chelate having the formula of $TiX_m(OR)_n$, X is a radical derived from an organic 1,3-dicarbonyl compound, m is an average of the integral numbers which individually range from 0 to 2 and at least one m that is not 0; n is an average of the integral numbers ranging from 2 to 4; R is independently H, an alkyl group, or aryl group; and said stabilizer is present in the range of from about 0.001% to about 20% by weight of said dispersion.

2. A composition according to claim 1 wherein said composition is said dispersion.

3. A composition according to claim 2 wherein said stabilizer is one or more hydroxy carboxylic acid, alkoxylated quaternary ammonium salt, aminocarboxylic acid, alkanolamine, inorganic phosphate salt, or combinations of two or more thereof.

4. A composition according to claim 2 wherein said stabilizer is one or more hydroxy carboxylic acid.

5. A composition according to claim 2 wherein said stabilizer is citric acid, lactic acid, glycolic acid, tartaric acid, malic acid, ethanolamine, diethanolamine, triethanolamine, tetrahydroxyisopropylethylenediamine, glycine, bis-hydroxyethyl glycine, hydroxyethyl glycine, tetrapotassium pyrophosphate, potassium tripolyphosphate, sodium tripolyphosphate, potassium tetra phosphate, sodium pentapolyphosphate, sodium hexapolyphosphate, potassium pyrophosphate, potassium pyrophosphite, sodium pyrophosphate, sodium pyrophosphate decahydrate, sodium pyrophosphite, ethyl phosphonate, propyl phosphonate, hydroxymethyl phosphonate, di(polyoxyethylene) hydroxymethyl phosphonate, methylphosphonoacetate, ethyl methylphosphonoacetate, methyl ethylphosphonoacetate, ethyl ethylphosphonoacetate, propyl dimethylphosphonoacetate, methyl diethylphosphonoacetate, triethyl phosphonoacetate, or combinations of two or more thereof.

6. A composition according to claim 4 wherein said stabilizer is citric acid.

7. A composition according to claim 4 wherein said stabilizer further comprises one or more nonionic, cationic, or anionic surfactant.

8. A composition according to claim 2 wherein said stabilizer is present in said dispersion in the range of from about 0.01 to about 10 weight percent.

9. A composition according to claim 1 wherein said dispersion is said dispersion; said polymer comprises one or more repeat units derived from $TiX_2O$, $TiX_2(OR)O$, $TiX(O)_2$, $TiX(OR)O$, $TiX(OR)_2O$, $Ti(O)_2$, $Ti(OR)(O)_2$, and $Ti(OR)_2(O)_2$; said stabilizer is hydroxy carboxylic acid, alkoxylated quaternary ammonium salt, aminocarboxylic acid, alkanolamine, inorganic phosphate salt, or combinations of two or more thereof; and said stabilizer is present in said dispersion in the range of from about 0.01 to about 10 weight percent.

10. A composition according to claim 1 wherein said stabilizer is citric acid, lactic acid, glycolic acid, tartaric acid, malic acid, ethanolamine, diethanolamine, triethanolamine, tetrahydroxyisopropylethylenediamine, glycine, bis-hydroxyethyl glycine, hydroxyethyl glycine, tetrapotassium pyrophosphate, potassium tripolyphosphate, sodium tripolyphosphate, potassium tetra phosphate, sodium pentapolyphosphate, sodium hexapolyphosphate, potassium pyrophosphate, potassium pyrophosphite, sodium pyrophosphate, sodium pyrophosphate decahydrate, sodium pyrophosphite, ethyl phosphonate, propyl phosphonate, hydroxymethyl phosphonate, di(polyoxyethylene) hydroxymethyl phosphonate, methylphosphonoacetate, ethyl methylphosphonoacetate, methyl ethylphosphonoacetate, ethyl ethylphosphonoacetate, propyl dimethylphosphonoacetate, methyl diethylphosphonoacetate, triethyl phosphonoacetate, or combinations of two or more thereof.

11. A composition according to claim 10 wherein X is derived from 2,4-pentanedione and said stabilizer is citric acid.

12. A composition according to claim 11 wherein said stabilizer further comprises one or more nonionic, cationic, or anionic surfactant.

13. A process comprising (1) contacting a tetraalkyl titanate with a chelating agent to produce a product mixture comprising a titanium chelate and an alcohol; (2) contacting said product mixture with water under a condition effective to produce a dispersion of a titanium chelate polymer; (3) optionally reducing the alcohol content in said dispersion; and (4) contacting said dispersion with a stabilizing amount of a stabilizer to produce a stable dispersion of titanium chelate polymer.

14. A process according to claim 13 wherein said stabilizer is one or more hydroxy carboxylic acid, alkoxylated quaternary ammonium salt, aminocarboxylic acid, alkanolamine, inorganic phosphate salt, or combinations of two or more thereof.

15. A process according to claim 13 wherein said stabilizer is one or more hydroxy carboxylic acid.

16. A process according to claim 13 wherein said stabilizer is citric acid, lactic acid, glycolic acid, tartaric acid, malic acid, ethanolamine, diethanolamine, triethanolamine, tetrahydroxyisopropylethylenediamine, glycine, bis-hydroxyethyl glycine, hydroxyethyl glycine, tetrapotassium pyrophosphate, potassium tripolyphosphate, sodium tripolyphosphate, potassium tetra phosphate, sodium pentapolyphosphate, sodium hexapolyphosphate, potassium pyrophosphate, potassium pyrophosphite, sodium pyrophosphate, sodium pyrophosphate decahydrate, sodium pyrophosphite, ethyl phosphonate, propyl phosphonate, hydroxymethyl phosphonate, di(polyoxyethylene) hydroxymethyl phosphonate, methylphosphonoacetate, ethyl methylphosphonoacetate, methyl ethylphosphonoacetate, ethyl ethylphosphonoacetate, propyl dimethylphosphonoacetate, methyl diethylphosphonoacetate, triethyl phosphonoacetate, or combinations of two or more thereof.

17. A process according to claim 13 wherein said stabilizer is citric acid.

18. A process according to claim 17 wherein said stabilizer further comprises one or more nonionic, cationic, or anionic surfactant.

19. A process according to claim 2 wherein said stabilizer is present in said dispersion in the range of from about 0.1 to about 10 weight percent.

20. A process comprising (1) contacting a tetraalkyl titanate with a chelating agent to produce a product mixture comprising a titanium chelate and an alcohol; (2) contacting said product mixture with water under a condition effective to produce a dispersion of a titanium chelate polymer; (3) recovering said titanium chelate polymer; and (4) optionally drying and grinding said titanium chelate polymer solids; (5) contacting said polymer with water to produce a dispersion; and (6) contacting said dispersion with a stabilizing amount of a stabilizer to produce a stable dispersion of titanium chelate polymer.

\* \* \* \* \*